United States Patent [19]

Gutweiler et al.

[11] Patent Number: 5,367,015

[45] Date of Patent: Nov. 22, 1994

[54] POLYVINYL ACETALS HAVING IMPROVED MELT VISCOSITY CHARACTERISTICS, PROCESSES FOR THEIR PREPARATION AND THEIR USE

[75] Inventors: Matthias Gutweiler, Taunusstein; Matthias Kroggel, Kelkheim, both of Germany

[73] Assignee: Hoechst Aktinegesellschaft, Germany

[21] Appl. No.: 955,645

[22] Filed: Oct. 2, 1992

[30] Foreign Application Priority Data

Oct. 4, 1991 [DE] Germany ............................. 4133023

[51] Int. Cl.$^5$ ............................................. C08L 29/04
[52] U.S. Cl. ..................... 524/557; 524/503; 525/57; 525/61; 526/303.1; 526/304; 526/306; 526/319; 526/330
[58] Field of Search ............... 525/61, 57; 524/503, 524/557; 526/303.1, 304, 306, 319, 330

[56] References Cited

U.S. PATENT DOCUMENTS

| | | | |
|---|---|---|---|
| 2,332,895 | 10/1943 | D'Alelio | 174/125 |
| 2,332,898 | 10/1943 | D'Alelio | 174/125 |
| 2,363,297 | 11/1944 | D'Alelio | 525/60 |
| 4,666,957 | 5/1987 | Marrocco | 525/61 X |
| 4,814,529 | 3/1989 | Cartier et al. | 525/61 |
| 4,874,814 | 10/1989 | Cartier et al. | 525/61 |
| 4,902,464 | 2/1990 | Cartier et al. | 264/211.24 |

FOREIGN PATENT DOCUMENTS

| | | | |
|---|---|---|---|
| 0130424 | 5/1946 | Australia | 525/61 |
| 0704034 | 2/1965 | Canada | 525/61 |
| 0211818 | 2/1987 | European Pat. Off. | |
| 0080304 | 5/1983 | Japan | 525/60 |
| 0111850 | 7/1983 | Japan | 525/60 |

*Primary Examiner*—Judy M. Reddic
*Attorney, Agent, or Firm*—Bierman and Muserlian

[57] ABSTRACT

Preparation of soluble polyvinyl acetals having a low degree of crosslinking, which show improved melt viscosity characteristics, by acetalization of soluble polyvinyl alcohols having a low degree of crosslinking, which have been obtained by hydrolysis or alcoholysis of soluble copolymers having a low degree of crosslinking of vinyl esters and monomers having multiple ethylenic unsaturations, for example, glyoxal bisacrylamide. As against comparable non-crosslinked, soluble polyvinyl acetals, polyvinyl acetals having a low degree of crosslinking according to the present invention show increased intrinsic viscosities and surprisingly exhibit advantageous properties in thermoplastic forming, in particular when extruded in a plastified form. The polyvinyl acetals having a low degree of crosslinking furthermore have improved mechanical properties in comparison with non-crosslinked polyvinyl acetals and, in the form of plastified films, are particularly advantageously employed in the production of composite glass.

16 Claims, No Drawings

POLYVINYL ACETALS HAVING IMPROVED MELT VISCOSITY CHARACTERISTICS, PROCESSES FOR THEIR PREPARATION AND THEIR USE

The invention relates to polyvinyl acetals having improved melt viscosity characteristics, prepared from soluble polyvinyl alcohols having a low degree of crosslinking by reaction with aldehydes or aldehyde acetals under acetalization conditions, processes for their preparation and their use, in particular as plasticized and advantageously extrudable thermoplastic molding compositions for the production of composite glass sheets.

Plasticizer-containing polyvinyl butyral sheets (PVB sheets) are known as is their use in laminates, in particular for the production of laminated safety glasses for the automobile sector and the building sector. It is also known that the rheological characteristics of plasticized PVB compositions are of great importance, both during extrusion and also during the production of composites. For optimum extrusion a material is required which has as low as possible a viscosity under the shear rates [$\gamma$] in the range of $\gamma = 1$ to $1000 \, s^{-1}$ which occur under extrusion conditions, in order to facilitate extrusion under mild heat conditions which nevertheless is coupled with high mass throughputs.

The plastic deformability and the flowability of the composite sheet also play a major role in the production of composites, in particular in the temperature range from 60° C. to 170° C. If the flowability is too low, there is inadequate filling of the space inside the composite up to the inclusion of air bubbles. If, on the other hand, the flowability is too high, polymer material flows out and the edges of the composite are contaminated, which can make it necessary to carry out time-consuming finishing operations. In order to characterize the flowability of the plasticized polymer under composite conditions, the viscosity of the resin composition in the low shear range ($\gamma = <1 \, s^{-1}$) is determined. The spectrum of properties required here frequently gives rise to a conflict between optimization of the extrudability on the one hand and of the flow properties during composite production on the other hand.

It has now been found, surprisingly, that the difficulties and disadvantages mentioned, in particular in the case of the composite sheets, can be overcome by using plasticizer-containing polyvinyl acetals, which have a very high intrinsic viscosity.

As is known, intrinsic viscosity in the case of polymers denotes the fall in the viscosity with increasing shear rate [$\gamma$]. The viscosity in the low shear range depends on the weight-average molecular weight of the polymer resin and the width of the molecular weight distribution of the polymer resin determines the level of the intrinsic viscosity, so that in order to achieve a high intrinsic viscosity as broad as possible a molecular weight distribution is advantageous or desirable.

A broad molecular weight distribution can be achieved by various methods. Thus, by admixing various polyvinyl alcohol (PVAL) types during preparation of the polyvinyl acetal a correspondingly broad distribution can be established in the resulting polyvinyl acetal resin.

However, such large amounts of low molecular weight PVAL types are required to produce a sufficiently high intrinsic viscosity that these lower the temperature stability of the end product and lead to yellowness values which are no longer acceptable in the composite sheet.

Surprisingly, however, an adequate intrinsic viscosity can now be achieved by the preparation of polyvinyl acetal resins having a low degree of crosslinking, such as can be obtained by the use of PVAL types having a low degree of crosslinking as the starting materials for the polyvinyl acetal preparation.

The invention therefore relates to polyvinyl acetals having improved melt viscosity characteristics, prepared from polyvinyl alcohols and aldehydes or aldehyde acetals under acetalization conditions, which polyvinyl acetals are derived from soluble polyvinyl alcohols having a low degree of crosslinking, which have been obtained by hydrolysis or alcoholysis of soluble copolymers, having a low degree of crosslinking, of vinyl esters and copolymerizable monomers having multiple ethylenic unsaturations, and have been reacted with aldehydes or aldehyde acetals under acetalization conditions to give soluble polyvinyl acetals having a low degree of crosslinking.

Crosslinked polyvinyl acetal types can also be obtained by acetalization of non-crosslinked PVAL using bifunctional or trifunctional aldehydes (cf. European Published Specification 0211818 and U.S. Pat. Nos. 4,814,529, 4,874,814 and 4,902,464). However, the polyvinyl acetal resins prepared in this way have a few decisive disadvantages. Thus, under certain unfavorable conditions, such as, for example, if an acid titer should arise in the sheet, the acetal bonds can be cleaved again and the intrinsic viscosity can thus be lost.

As is known, the preparation process for polyvinyl acetals which is most advantageous from the economic and ecological standpoints is the acetalization of aqueous PVAL solutions. In this process the polymeric acetal formed precipitates immediately and its further acetalization then takes place in heterogeneous phase. However, in this reaction the use of polyfunctional aldehydes or other polyfunctional crosslinking agents can lead to increased local crosslinking densities, which give rise to an increase in cloudiness in the plasticizer-containing sheets produced from the resulting polyvinyl acetals and, if crosslinking is relatively extensive, lead to polymer particles which can no longer be broken down by the plasticizer.

In addition to the theological properties of a plasticizer-containing polyvinyl acetal sheet to be used as composite sheet, the mechanical properties of the composite sheet also play an important role. It is known that if the composite sheet has a high capacity for energy absorption this also gives rise to good resistance of the finished glass composites to penetration. Surprisingly, it has now been found that plasticized polyvinyl acetal sheets having a low degree of crosslinking, which had been prepared by acetalization of soluble PVAL having a low degree of crosslinking, according to the invention, have better mechanical properties than comparable non-crosslinked polyvinyl acetal sheets.

The polyvinyl alcohols having a low degree of crosslinking (PVAL ldc) according to the invention can be prepared by free radical-initiated copolymerization of carboxylic acid vinyl esters with copolymerizable monomers having multiple ethylenic unsaturations and subsequent saponification or transesterification of the recruiting copolymers having a low degree of crosslinking. Monomers having multiple ethylenic unsaturations which are preferably suitable for the free radical copolymerization are those which are not hydrolyzable either under the alkaline or acid conditions of the hydrolysis and the acid conditions of the acetalization or under the alkaline conditions of the subsequent polyvinyl acetal stabilization. Preferred comonomers of this type are, in particular, acrylamides and methacrylamides having multiple, preferably two or three, ethylenic unsaturations. The use of compounds of the formula I having two ethylenic unsaturations,

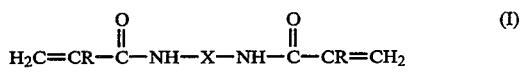

wherein
R=—H, —CH$_3$
X=—(CHY)$_n$—,
n=1 to 10, preferably 2 to 4, and
Y=—H, —OH, and preferably Y=—OH and n=2,
is particularly preferred.

The use of glyoxal bisacrylamide is particularly preferred, the free hydroxyl groups on the radical linking the two acrylamide units stabilizing or ensuring the hydrophilic character of the polyvinyl alcohol and accordingly the good solubility in water, including of the polyvinyl alcohol having a low degree of crosslinking.

The carboxylic acid vinyl esters used in the copolymerization preferably have 3 to 20 carbon atoms; vinyl acetate and vinyl propionate, in particular vinyl acetate, are particularly preferred. Optionally, further monoethylenically unsaturated monomers, preferably, for example, those from the group comprising acrylamides and methacrylamides, C$_1$–C$_4$ acrylates and methacrylates, acrylic acid and methacrylic acid, N-vinylpyrrolidone and its derivatives, or polyfunctional monoethylenically unsaturated carboxylic acids, carboxylic acid esters or carboxylic acid anhydrides, preferably, for example, from the group comprising maleic acid and itaconic acid, their esters and half-esters or their anhydrides, are used in the copolymerization.

The amount of copolymerizable monomers having multiple ethylenic unsaturations, which are also termed crosslinking agents, which is to be used in the copolymerization depends, inter alia, on their polarity and their capacity for copolymerization with carboxylic acid vinyl esters. The amount is to be so chosen that the polyvinyl carboxylic acid ester copolymers having a low degree of crosslinking which are obtainable on copolymerization, or the polyvinyl alcohols having a low degree of crosslinking which are obtainable after saponification or transesterification of the latter, are soluble in suitable solvents without optical turbidity. This is possible only if the amounts of copolymerizing crosslinking agents are sufficiently low with respect to the carboxylic acid vinyl esters employed and accordingly the number of crosslinking sites in the copolymers. Preferably, the crosslinking agents are therefore used in amounts of 0.001 to 5 mol %, in particular 0.01 to 1 mol %, with respect to the total molar amount of the copolymerizable monomers employed.

Free radical-forming initiators which can be used for the polymerization are, in principle, all agents which form free radicals, such as are customarily used in the polymerization of carboxylic acid vinyl esters, preferably inorganic and organic peroxides, percarbonates and azo compounds. The use of dibenzoyl peroxide, azobisisobutyronitrile and tert-butyl perisooctoate is particularly preferred.

The polymerization can be carried out in suspension or emulsion or in solution or in bulk, the polymerization in solution being preferred. Solvents used are in particular alcohols having 1 to 4 carbon atoms, chloroform, benzene, toluene, xylene, tetrahydrofuran and dioxane, preferably in amounts of up to 50% by weight, in particular 5 to 30% by weight, based on the total amount of the monomers employed. Particularly preferred solvents are methanol and ethanol.

For advantageous shortening of the polymer chain segments between the crosslinking sites in the resulting macromolecules, conventional molecular weight regulating agents, or so-called radical capturing agents, which have the effect of breaking of the radical chain, for example mercaptans, aldehydes, phenols or amines, can also be used in the polymerization.

The synthesis of the vinyl ester copolymers is possible by generally known polymerization methods, for example by the metering process or also as a batch reaction. Unconverted monomers, in particular unconverted carboxylic acid vinyl ester, are preferably removed from the reaction batch after the end of the reaction. This can usually be effected by azeotropic distillation of the residual monomers with the additional use of suitable azeotrope-forming solvents, preferably, for example, methanol. The polyvinylcarboxylic acid ester copolymers having a low degree of crosslinking, according to the invention, can be isolated, for example, by distilling off the solvent or by precipitating the polymer from the reaction mixture by adding suitable precipitating agents.

The saponification or transesterification of the polyvinyl carboxylic acid ester copolymers having a low degree of crosslinking, according to the invention, to give the corresponding partially or completely saponified polyvinyl alcohols having a low degree of crosslinking can be carried out by generally known processes, preferably in solution, with the addition of catalysts, for example acid catalysts, such as inorganic or organic mineral acids, for example hydrochloric acid, sulfuric acid, phosphoric acid, nitric acid, trifluoroacetic acid or p-toluenesulfonic acid. However, the use of basic catalysts, preferably sodium hydroxide solution, potassium hydroxide solution, alkali metal alcoholates or amines, is preferred.

The solvents used for the saponification or transesterification are, in particular, alcohols having 1 to 4 carbon atoms, halogenated hydrocarbons, preferably chloroform or methylene chloride, aromatic compounds, preferably toluene, benzene and xylenes, or ethers, preferably diethyl ether, tetrahydrofuran or dioxane. The use of water-miscible solvents, which optionally are used in combination with water, is particularly preferred.

Depending on the reaction conditions, partially or completely saponified products having a low degree of crosslinking, according to the invention, are obtainable by this route. Preferably, the degree of hydrolysis of the resulting polyvinyl alcohols having a low degree of crosslinking (PVAL ldc) is between 50 and 100 mol %, in particular 95 to 99.9 mol %, based on the hydrolyzable monomer units contained in the unsaponified starting polyvinylcarboxylic acid ester copolymer having a low degree of crosslinking.

Polyvinylcarboxylic acid ester copolymers which are crosslinked but still completely soluble and not saponified differ from conventional non-crosslinked and non-saponified polyvinylcarboxylic acid esters prepared under the same conditions in that the viscosity of their solutions in organic solvents is higher. Generally known solution viscosity measurement methods, such as, for example, capillary viscometry or others, are suitable for analysis here. However, in the case of very low to low degrees of crosslinking, these methods fail in practice because their sensitivity is too low. However, the determination of the so-called complex viscosity with the aid of oscillation rheometry on molten polymer samples has now, surprisingly, proved to be a suitable differentiating analytical method in such cases. The polyvinylcarboxylic acid ester copolymers having a low degree of crosslinking, according to the invention, can therefore be characterized in particular by this method and are distinguished, inter alia, by the fact that, in oscillation rheometric tests on their melts at 180° C. in the oscillation cycle frequency range of $10^2$ to $10^{-1}$ rad/s, for example, they are able to show an approximately 1100% increase in their complex viscosity, compared with a comparable value of about 450% in the case of non-crosslinked polyvinyl acetate. The oscillation rheometric tests were carried out using an oscillation rheometer from Rheometrics, USA, as a function of the oscillation cycle frequency [rad/s], which is also termed the vibration cycle frequency.

In contrast to the non-saponified polyvinylcarboxylic acid ester copolymers having a low degree of crosslinking, however, it is possible to demonstrate crosslinking in the case of the saponified polyvinylcarboxylic acid ester copolymers having a low degree of crosslinking, i.e. in the case of the polyvinyl alcohols having a low degree of crosslinking (PVAL ldc) obtainable by saponification, only with the aid of conventional solution viscometric methods. As is known, the determination of the melt viscosity of polyvinyl alcohols is generally not a suitable analytical method, since polyvinyl alcohols undergo degradation reactions and display decomposition phenomena at the melt temperatures required.

When the complex viscosities of polymer melts are measured in an oscillation rheometer, the fall in viscosity with increasing oscillation cycle frequency (rad/s) describes the analogous viscosity characteristics of the polymer melts under corresponding shear rates [$\gamma$] (Cox-Merz relationship), i.e. their analogous fall in viscosity. The measurements were carried out at different vibration cycle frequencies using the oscillation rheometer from Rheometrics (USA) on polymer melts at the particular temperatures indicated, preferably at $10^{-1}$, $10^0$, $10^1$ and $10^2$ rad/s.

In the same way as the soluble polyvinylcarboxylic acid ester copolymers having a low degree of crosslinking prepared according to the invention, the soluble polyvinyl acetals having a low degree of crosslinking prepared therefrom via the step of soluble polyvinyl alcohols having a low degree of crosslinking can also be characterized via their polymer melts, whilst the soluble polyvinyl alcohols, having a low degree of crosslinking, of the intermediate stage, as already mentioned above, cannot be measured by oscillation rheometry since they decompose at the melt temperatures required. Whilst the solution viscosity increases comparably with increasing molecular weights in a known manner in the case of non-crosslinked soluble polyvinyl esters and in the case of comparable soluble polyvinyl ester copolymers having a low degree of crosslinking, the complex viscosities of these two types of compound surprisingly show wide divergence. The polymer melts of the non-crosslinked polyvinyl esters show a relatively slight fall in their complex viscosity indices with increasing oscillation cycle frequency in the temperature range from 140° to 240° C., whilst the melts of the soluble polyvinyl ester copolymers having a low degree of crosslinking show a comparatively very sharp fall. Thus, in the measurement range from $10^{-1}$ to $10^2$ rad/s and at a polymer melt temperature of 180° C., the fall, for example, in the case of a non-crosslinked polyvinyl acetate is 4.5:1, whereas it is, for example, in the region of 12:1 in the case of a comparable soluble polyvinyl acetate copolymer having a low degree of crosslinking, according to the invention, which in the case of the latter polymer having a low degree of crosslinking has a surprisingly advantageous effect on its extrusion characteristics. Depending on the molecular weight and the number of crosslinking sites present in the polyvinyl acetate having a low degree of crosslinking, the fall in the complex viscosity indices in the measurement range from $10^{-1}$ to $10^2$ rad/s at a melt temperature of 180° C. can assume ratio values of up to 50:1; polyvinyl acetates having a low degree of crosslinking which have ratio values of 25:1 to 6:1 are preferred. In the case of the polyvinyl acetals, the relationship between the complex viscosity indices for the products having a low degree of crosslinking in comparison with those of the non-crosslinked products is similar to that in the case of their corresponding starting polyvinyl esters. Thus, in the measurement range from $10^{-1}$ to $10^2$ rad/s and at a polymer melt temperature of 200° C., the fall, for example, in the case of a non-crosslinked polyvinyl butyral prepared from non-crosslinked polyvinyl acetate is 4.5:1, whilst it is, for example, in the region of 11:1 in the case of a soluble polyvinyl butyral having a low degree of crosslinking, according to the invention, prepared from soluble polyvinyl acetate copolymer having a low degree of crosslinking, according to the invention. Depending on the polyvinyl alcohol having a low degree of crosslinking which is used for the acetalization, the fall in the complex viscosity indices in the measurement range from $10^{-1}$ to $10^2$ rad/s at a melt temperature of 200° C. can be up to 48:1, preferably 6:1 to 25:1.

The polyvinyl alcohols having a low degree of crosslinking (PVAL ldc) obtainable according to the invention are reacted in organic solvents, or preferably in aqueous solution, under the catalytic action of acids, with aldehydes or aldehyde acetals to give polyvinyl acetals. In this context it is possible either to meter the acid into mixtures of PVAL ldc suspensions in organic solvents or into aqueous polyvinyl alcohol solutions and aldehydes, or to meter the aldehyde component into mixtures of PVAL ldc suspension or PVAL ldc solution and acid catalyst. One-pot reactions can also be carried out, but frequently lead to agglomeration of the resulting polyvinyl acetal.

The polyvinyl alcohols having a low degree of crosslinking, according to the invention, can also be used as a mixture with non-crosslinked polyvinyl alcohols for acetalization. In this case the proportion of non-crosslinked polyvinyl alcohols can preferably be up to 80% by weight, in particular 5 to 40% by weight, based on the total amount of the polyvinyl alcohol to be acetalized. The polyvinyl alcohols can also be acetalized individually and the acetals then mixed with one another.

In principle, all known acid catalysts and aldehydes or aldehyde acetals which can be used for the preparation of polyvinyl acetals known hitherto can be used for the acetalization of the polyvinyl alcohols having a low degree of crosslinking, or PVAL mixtures, to be used according to the invention.

Inorganic acid catalysts, such as, for example, hydrochloric acid, phosphoric acid, sulfuric acid or nitric acid, are preferably used for the acetalization. Aldehydes which can be used are straight-chain and/or branched aliphatic and/or cycloaliphatic and/or aromatic aldehydes; preferred aldehydes here are those having 1 to 20 carbon atoms, such as, for example, benzaldehyde, formaldehyde, acetaldehyde, propionaldehyde, butyraldehyde and isononanaldehyde, as well as, optionally, derivatives of these compounds; the use of butyraldehyde is particularly preferred. The use of hydroxyaldehydes can be advantageous in isolated cases. Mixtures of the aldehydes listed can also be used for the acetalization and in some cases can lead to advantageous results. The co-use of surface-active substances or of emulsifiers, preferably of surface-active acids, which at the same time are also able to act as acid catalysts, such as, for example, $(C_8-C_{20})$-alkanesulfonic acids, fluorinated long-chain fatty acids or sulfonic acids or long-chain alkyl sulfosuccinates has an advantageous effect on the course of acetalization. Moreover, mixtures of surface-active substances or of emulsifiers can also be used.

To prepare the polyvinyl acetals having a low degree of crosslinking, according to the invention, polyvinyl alcohols having a low degree of crosslinking, according to the invention, of the abovementioned type, or mixtures thereof or mixtures thereof with other polyvinyl alcohols are dissolved in water, preferably at elevated temperature, it being possible for the concentration of the polymer solution to be preferably between 1 and 50% by weight, in particular between 5 and 20% by weight, with respect to the PVAL solution. The polyvinyl alcohols of the indicated type are then acetalized by conventional methods, preferably, for example, by metering the acid into the aldehyde-containing polyvinyl alcohol solution. For this operation the acid is preferably metered in the course of 5 to 300 minutes, vigorous stirring being advantageous. However, the reaction can also be carried out as a batch reaction. The amount of aldehyde to the added depends on the target degree of acetalization and the stoichiometric requirement which can be calculated therefrom. Because, as is known, the aldehyde conversion is usually not complete, the reaction is preferably carried out using excess aldehyde. Particularly preferably, the aldehyde is used in an excess of up to 40 mol %, in particular 10 to 20 mol %. In a particularly preferred process variant, the acetalization is initiated in the aqueous starting polyvinyl alcohol/aldehyde solution at temperatures of 10° to 20° C., after which the polyvinyl acetal formed immediately precipitates, usually in the form of a powder. In order to complete the reaction, the reaction mixture is slowly heated to room temperature and, if appropriate, this is followed by a post-reaction at higher temperatures, for example at 25° C. to 80° C., which takes about 1 to 5 hours. The reaction is optionally carried out with the addition of emulsifier, it being possible to add the emulsifier, preferably a surface-active sulfonic acid, either to the starting solution or during the course of the reaction and/or during the post-reaction. The amount of acid catalyst to be used depends, inter alia, on the target degree of acetalization and can preferably be up to 1.1 gram equivalent, based on the molar vinyl alcohol unit content.

The polyvinyl acetal formed, which is preferably insoluble in water and which preferably precipitates in powder form from the aqueous reaction solution, is filtered off from the liquid phase with suction, washed with water which has been rendered weakly alkaline (pH 9 to 12) and dried.

A substantially complete neutralization of the acid catalyst can be achieved by aftertreatment of the polymer powder in alkali metal hydroxide solution. To this end, an aqueous polymer suspension is heated for about 1 to 4 hours at 40° to 90° C. in the pH range of 9 to 13, then again filtered off with suction, washed with water and dried.

In principle, the preparation of all polyvinyl acetals according to the invention can also be carried out in organic solvents. It can be carried out as a two-phase or multi-phase reaction using the polyvinyl alcohols which are not soluble in organic solvents. A single-phase reaction can also be achieved by adding water to solvents which are soluble in water or can be diluted in water.

Suitable solvents are, for example, xylenes, toluene, chloroform and methylene chloride, but in particular water-miscible solvents, especially water-soluble alcohols, preferably ethanol and methanol.

To prepare the polyvinyl acetals having a low degree of crosslinking, according to the invention, in organic solvents, the acid catalyst, the aldehyde and the PVAL ldc are slurried or suspended or dispersed or dissolved in the organic solvent and the mixture is refluxed. The aldehyde can optionally also be metered in during the course of the reaction. The polyvinyl alcohols which are insoluble in the organic solvent go into solution as the acetalization proceeds.

Aldehydes which can be used are preferably straight-chain ant/or branched aliphatic and/or cycloaliphatic and/or aromatic aldehydes. Aldehydes having 1 to 20 carbon atoms, such as, for example, benzaldehyde, formaldehyde, acetaldehyde, propionaldehyde, butyraldehyde and isononanaldehyde are particularly preferred, but butyraldehyde is very particularly used. Furthermore, the additional use of aldehydes containing hydroxyl groups can be advantageous. After the acetalization reaction is complete, the reaction product is precipitated by adding non-polar solvents, such as, for example, pentane, hexane, heptane and the like, to the reaction solution, or by pouring the reaction solution into ice-cold water or an ice-cold water/alcohol mixture, filtered off from the liquid phase with suction, washed with water which has been rendered weakly alkaline (pH 9 to 12) and dried. Alternatively, the product can also be isolated by distilling off the solvent.

The polyvinyl acetals having a low degree of crosslinking which can be prepared according to the invention are preferably acetalized to such a degree that they contain from 15 to 28% by weight, in particular 18 to 24% by weight, of non-acetalized vinyl alcohol units after the acetalization.

The invention therefore also relates to a process for the preparation of polyvinyl acetals having improved melt viscosity characteristics by acetalization of soluble polyvinyl alcohols having a low degree of crosslinking, wherein a soluble copolymer having a low degree of crosslinking is first prepared from vinyl ester and a copolymerizable monomer having multiple ethylenic unsaturations, by free radical-initiated copolymerization of the vinyl ester with the monomer containing multiple ethylenic unsaturations, and the resulting copolymer is then converted by hydrolysis or alcoholysis into a soluble polyvinyl alcohol having a low degree of crosslinking, the latter is converted into a soluble polyvinyl acetal having a low degree of crosslinking by reaction with aldehydes or aldehyde acetals under acetalization conditions and the soluble polyvinyl acetal having a low degree of crosslinking is isolated and optionally plasticized with the addition of plasticizer.

The polyvinyl acetals having a low degree of crosslinking, according to the invention, are suitable, on admixing with plasticizers and plasticizing, in particular for the production of sheets by thermoplastic deformation, the use of these sheets for the production of composite materials, in particular composite glasses, being very particularly preferred. Plasticizers which can be used are, in principle, all plasticizers which can be used for the commercially available polyvinyl acetals, preferably, for example, carboxylic acid esters of triethylene glycol, as well as adipic acid esters, phthalic acid esters and phosphoric acid esters of n- or iso-($C_2$–$C_{10}$)-alkanols. 2-Ethylbutyric acid esters and n-heptanoic acid esters of triethylene glycol and also di-n-hexyl adipate are particularly preferred.

In addition, the polyvinyl acetals having a low degree of crosslinking, according to the invention, are also miscible with commercially available non-crosslinked polyvinyl acetals, preferably in a weight ratio of 99:1 to 1:99, in particular 95:5 to 5:95 and particularly preferably 80:20 to 20:80. After plasticizing, mixtures of this type can also be processed thermoplastically to give sheets, which again can preferably be used for the production of composite glasses.

The plasticizers are added in the customary amounts, i.e. the polymer/plasticizer mixtures can contain preferably, for example, 20 to 50% by weight and in particular 23 to 35% by weight of plasticizer.

The plasticized polyvinyl acetal extrusion molding composition according to the invention is in particular processed thermoplastically to give sheets, it preferably being extruded through a sheet die to give a 0.2 to 2 mm thick sheet. The extrusion temperature is in the customary range, preferably, for example, between 140° and 240° C., it being possible for higher temperatures to be reached for a short time. The sheet molding composition can contain the customary additives, such as, for example, small amounts of alkali, for example 0.001 to 0.1% by weight, with respect to the molding composition, alkali metal hydroxide or an alkali metal salt having an alkaline reaction, and also the known non-stick agents, such as, for example, salts of carboxylic acids, in particular potassium and magnesium salts of formic acid or acetic acid, or salts of dicarboxylic acids, as well as certain silanes and siloxanes. The concentration of these non-stick agents is preferably, for example, between 0.001 and 0.2% by weight, based on the molding composition.

In addition, because of their good capacity for adhesion to diverse materials, in particular to glass and to metals, the polyvinyl acetals having a low degree of crosslinking, according to the invention, can be widely used as coating compositions. Moreover, they can be used in numerous fields of application in which polyvinyl acetals of the type known hitherto are usually used, in particular as binders for pigments, for the preparation of printing inks, anti-corrosion coatings, light-sensitive coatings, hot-melt adhesives and solvent-containing adhesives, as well as binders for ceramic powders. Depending on the applications, the polyvinyl acetals having a low degree of crosslinking, according to the invention, can be provided with various known additives, such as, for example, pigments, dyes, plasticizers and stabilizers. Suitable stabilizers are the known phenolic stabilizers, such as, for example, 2,4-di-tert-butyl-p-cresol, phosphites, such as, for example, trisnonylphenyl phosphite, and the like. In many cases the addition of these substances can be made before, during or after the preparation of the polymers according to the invention.

The extrusion molding compositions having a low degree of crosslinking which are prepared according to the invention have a higher intrinsic viscosity, compared with non-crosslinked extrusion molding compositions. Nevertheless, the resulting lower extrusion viscosity in the case of the former compositions leads to a composite sheet which does not have too high a flowability or adverse flowability in practical use under composite conditions. By using different polyvinyl acetals having a low degree of crosslinking, the level of the intrinsic viscosity can advantageously be matched to the particular application problem.

The mechanical properties of the plasticized polyvinyl acetals having a low degree of crosslinking clearly differ advantageously from those of non-crosslinked plasticized polyvinyl acetals, as can be seen, inter alia, in particular from the values for corresponding polyvinyl butyrals PVBu ldc and PVBu in Table 4 below. The improved energy-absorption capacity of plasticizer-containing composite sheets according to the invention leads, in particular, to the finished glass composites having a higher resistance to penetration.

The invention is illustrated in more detail by means of the following examples.

A) PREPARATION OF POLYVINYL ACETATE

Comparison Example 1

Preparation of non-crosslinked polyvinyl acetate (PVAC)

3000 g of vinyl acetate, 750 g of methanol and 0.6 g of azobisisobutyronitrile are refluxed for 3 hours in a reaction vessel under a nitrogen atmosphere. The unreacted residual monomer fraction is then distilled off as an azeotrope under vacuum and the resulting PVAC is obtained in solid form.

The characteristics of the product are summarized in Table 1.

Example 1

Preparation of polyvinyl acetate having a low degree of crosslinking (PVAC ldc)

The polymerization process is carried out as described in Comparison Example 1 except that 3 g of glyoxal bisacrylamide are added to the reaction mixture prior to heating. The resulting PVAC ldc is obtained in solid form.

The characteristics of the product are summarized in Table 1.

Comparison Example 2

Preparation of non-crosslinked polyvinyl acetate (PVAC)

3000 g of vinyl acetate, 750 g of methanol and 1.5 g of azobisisobutyronitrile are refluxed for 145 minutes in a reaction vessel under a nitrogen atmosphere. The unreacted residual monomer fraction is then distilled off as an azeotrope under vacuum and the resulting PVAC is obtained in solid form.

The characteristics of the product are summarized in Table 1.

Example 2

Preparation of polyvinyl acetate having a low degree of crosslinking (PVAC ldc)

The polymerization process is carried out as described in Comparison Example 2 except that 1 g of glyoxal bisacrylamide is added to the reaction mixture prior to heating. The resulting PVAC ldc is obtained in solid form.

The characteristics of the product are summarized in Table 1.

Comparison Example 3

Preparation of non-crosslinked polyvinyl acetate (PVAC)

3000 g of vinyl acetate, 1300 g of methanol and 1.5 g of azobisisobutyronitrile are refluxed for 180 minutes in a reaction vessel under a nitrogen atmosphere. The unreacted residual monomer fraction is then distilled off as an azeotrope under vacuum and the resulting PVAC is obtained in solid form.

The characteristics of the product are summarized in Table 1.

Example 3

Preparation of polyvinyl acetate having a low degree of crosslinking (PVAC ldc)

The polymerization process is carried out as described in Comparison Example 3 except that 3 g of glyoxal bisacrylamide are added to the reaction mixture prior to heating. The resulting PVAC ldc is obtained in solid form.

The characteristics of the product are summarized in Table 1.

TABLE 1

Complex viscosity of polyvinyl acetate melts at 180° C., determined in the oscillation rheometer from Rheometrics at various vibration cycle frequencies [rad/s]

| Polyvinyl acetate melt from | Complex viscosity at 180° C. as a function of the vibration cycle frequency | | | |
|---|---|---|---|---|
| | $10^{-1}$ rad/s | $10^0$ rad/s | $10^1$ rad/s | $10^2$ rad/s |
| Comparison Example 1 (PVAC) | 2800 | 2200 | 1400 | 650 |
| Example 1 (PVAC 1 dc) | 10100 | 6900 | 3000 | 900 |
| Comparison Example 2 (PVAC) | 3300 | 2500 | 1300 | 650 |
| Example 2 (PVAC 1 dc) | 6000 | 4200 | 1500 | 460 |
| Comparison Example 3 (PVAC) | 1700 | 1600 | 1300 | 380 |
| Example 3 (PVAC 1 dc) | 3000 | 2800 | 1100 | 270 |

B) PREPARATION OF POLYVINYL ALCOHOL

Comparison Example 4

Preparation of non-crosslinked polyvinyl alcohol (PVAL)

1000 g of polyvinyl acetate from Comparison Example 1 are dissolved in 5667 g of methanol and 150 g of 10% strength by weight methanolic NaOH are added to the solution at room temperature. After about 29 minutes a gel forms, which is broken down into methanol-moist granules. After 2 hours the gel granules are filtered off with suction and slurried in 3000 g of methanol, 150 g of 10% strength by weight methanolic NaOH are added and the mixture is refluxed for 1 hour. After cooling, the reaction mixture is neutralized with glacial acetic acid. The non-crosslinked PVAL obtained in the form of finely divided product is filtered off with suction, washed several times with methanol and dried under vacuum at 50° C.

The characteristics of the product are summarized in Table 2.

Example 4

Preparation of polyvinyl alcohol having a low degree of crosslinking (PVAL ldc)

The hydrolysis process is carried out as described in Comparison Example 4 except that 1000 g of PVAC ldc, which has a low degree of crosslinking, from Example 1 are now used in place of 1000 g of non-crosslinked PVAC from Comparison Example 1. The resulting PVAL ldc, which has a low degree of crosslinking, is obtained in solid, finely divided form.

The characteristics of the product are summarized in Table 2.

Comparison Example 5

Preparation of non-crosslinked polyvinyl alcohol (PVAL)

The hydrolysis process is carried out as described in Comparison Example 4 except that 1000 g of non-crosslinked PVAC from Comparison Example 2 are now used in place of 1000 g of non-crosslinked PVAC from Comparison Example 1. The resulting non-crosslinked PVAL is obtained in solid, finely divided form.

The characteristics of the product are summarized in Table 2.

Example 5

Preparation of polyvinyl alcohol having a low degree of crosslinking (PVAL ldc)

The hydrolysis process is carried out as described in Comparison Example 4 except that 1000 g of PVAC ldc, which has a low degree of crosslinking, from Example 2 are now used in place of 1000 g of non-crosslinked PVAC from Comparison Example 1. The resulting PVAL ldc, which has a low degree of crosslinking, is obtained in solid, finely divided form.

The characteristics of the product are summarized in Table 2.

Comparison Example 6

Preparation of non-crosslinked polyvinyl alcohol (PVAL)

The hydrolysis process is carried out as described in Comparison Example 4 except that 1000 g of non-crosslinked PVAC from Comparison Example 3 are now used in place of 1000 g of non-crosslinked PVAC from Comparison Example 1. The resulting non-crosslinked PVAL is obtained in solid, finely divided form.

The characteristics of the product are summarized in Table 2.

Example 6

Preparation of polyvinyl alcohol having a low degree of crosslinking (PVAL ldc)

The hydrolysis process is carried out as described in Comparison Example 4 except that 1000 g of PVAC ldc, which has a low degree of crosslinking, from Example 3 are now used in place of 1000 g of non-crosslinked PVAC from Comparison Example 1. The resulting PVAL ldc, which has a low degree of crosslinking, is obtained in solid, finely divided form.

The characteristics of the product are summarized in Table 2.

TABLE 2

Degree of hydrolysis and viscosity index of polyvinyl alcohols

| Polyvinyl alcohol from | Degree of hydrolysis (mol %) | Viscosity of the 4% strength by weight aqueous solution in a Höppler viscometer at 20° C. (mPa · s) |
|---|---|---|
| Comparison Example 4 (PVAL) | 99.80 | 26.10 |
| Example 4 (PVAL 1 dc) | 99.80 | 42.80 |
| Comparison Example 5 (PVAL) | 99.80 | 34.30 |
| Example 5 (PVAL 1 dc) | 99.80 | 37.80 |
| Comparison Example 6 (PVAL) | 99.90 | 23.40 |
| Example 6 (PVAL 1 dc) | 99.80 | 27.30 |

C) PREPARATION OF POLYVINYL BUTYRAL

Comparison Example 7

Preparation of non-crosslinked polyvinyl butyral (PVBu)

540 g of non-crosslinked polyvinyl alcohol (PVAL) from Comparison Example 4 are dissolved in 7170 g of water, the solution is cooled to 16° C. and 309 g of butyraldehyde are added. 800 ml of a 20% strength by weight aqueous HCl solution are added dropwise in the course of 2 hours, with stirring, and during this addition the mixture is heated to 55° C. The reaction mixture is kept at 55° C. for a further 3 hours, with stirring, and the reaction goes to completion. The finely divided precipitated non-crosslinked polyvinyl butyral (PVBu) is washed with fully desalinated water and then suspended in 8 l of a dilute aqueous NaOH solution having a pH value of 11 and the suspension is heated at 70° C. for 2 hours. After again washing thoroughly with fully desalinated water, drying is carried out in a circulating air oven. A polyvinyl butyral powder which contains 21% by weight of polyvinyl alcohol units is obtained.

The polymer is gelled with 26% by weight, with respect to the total weight of the extrusion composition, of triethylene glycol di-n-heptanoate as plasticizer to give an extrusion composition and extruded using a Haake twinscrew extruder provided with a sheet die to give a 0.8 mm thick flat sheet (composition temperature 160° C.).

The properties of this flexible sheet are summarized in Tables 3 and 4.

Example 7

Preparation of polyvinyl butyral having a low degree of crosslinking (PVBu ldc)

The acetalization process is carried out as described in Comparison Example 7 except that 540 g of PVAL ldc, which has a low degree of crosslinking, from Example 6 are now used in place of 540 g of non-crosslinked PVAL from Comparison Example 4. The resulting polyvinyl butyral powder having a low degree of crosslinking contains 20.8% by weight of polyvinyl alcohol units.

The properties of the flexible sheet, produced analogously to Comparison Example 7, are summarized in Tables 3 and 4.

Comparison Example 8

Preparation of non-crosslinked polyvinyl butyral (PVBu)

The acetalization process is carried out as described in Comparison Example 7 except that 378 g of non-crosslinked PVAL from Comparison Example 5 and 162 g of commercially available non-crosslinked PVAL (®Mowiol 20-98 from Hoechst AG) are now used in place of 540 g of non-crosslinked PVAL from Comparison Example 4 and 312.6 g of butyraldehyde are now used in place of 309 g. The non-crosslinked PVBu, which is obtained in powder form, contains 20.1% by weight of polyvinyl alcohol units. In order to produce a flexible sheet, the PVBu is gelled with 26% by weight of dihexyl adipate, instead of triethylene glycol di-n-heptanoate, and extruded to give a 0.8 mm thick flat sheet.

The properties of this sheet are summarized in Tables 3 and 4. The Mowiol 20-98 used as starting PVAL has a degree of hydrolysis of 98 mol % and the viscosity of its 4% strength by weight aqueous solution in the Höppler viscometer at 20° C. is 20 centipoises.

Example 8

Preparation of polyvinyl butyral having a low degree of crosslinking (PVBu ldc)

The acetalization process and the sheet extrusion are carried out as described in Comparison Example 8 except that 378 g of PVAL ldc, which has a low degree of crosslinking, from Example 5 are now used in place of 378 g of non-crosslinked PVAL from Comparison Example 5.

The properties of the resulting flexible sheet are summarized in Tables 3 and 4.

TABLE 3

Complex viscosity of polyvinyl butyral melts at 200° C., determined in the oscillation rheometer from Rheometrics at various vibration cycle frequencies [rad/s]

| Polyvinyl butyral melt from | Complex viscosity at 200° C. as a function of the vibration cycle frequency | | | |
|---|---|---|---|---|
| | $10^{-1}$ rad/s | $10^0$ rad/s | $10^1$ rad/s | $10^2$ rad/s |
| Comparison Example 7 (PVBu) | 3300 | 3000 | 1900 | 950 |
| Example 7 (PVBu 1 dc) | 3800 | 2800 | 1200 | 400 |
| Comparison Example 8 (PVBu) | 7000 | 6500 | 3800 | 1100 |
| Example 8 (PVBu 1 dc) | 8300 | 5900 | 2800 | 700 |

TABLE 4

Mechanical properties of 0.8 mm thick, plasticizer-containing polyvinyl butyral extruded sheets

| Polyvinyl butyral flexible sheet from | Tear strength N/mm² | Tensile stress at 150% elongation N/mm² |
|---|---|---|
| Comparison Example 7 (PVBu) | 26.71 | 3.85 |
| Example 7 (PVBu 1 dc) | 27.62 | 4.29 |
| Comparison Example 8 (PVBu) | 27.90 | 2.68 |
| Example 8 (PVBu 1 dc) | 30.20 | 3.64 |

We claim:

1. A polyvinyl acetal having improved melt viscosity characteristics, prepared from polyvinyl alcohol and aldehyde or aldehyde acetal under acetalization conditions, which polyvinyl acetal is derived from water-soluble polyvinyl alcohol having a low degree of crosslinking, which result from hydrolysis or alcoholysis of an organic solvent soluble copolymer, having a low degree of crosslinking, of a vinyl ester and copolymerizable monomer units from acrylamides or methacrylamides having multiple ethylenic unsaturation, and have been reacted with an aldehyde or aldehyde acetal under acetalization conditions to give an organic-solvent soluble polyvinyl acetal having a low degree of crosslinking.

2. A polyvinyl acetal as claimed in claim 1, wherein the copolymer of vinyl ester and copolymerizable monomer units comprise monomer units from a compound of the formula I as the monomer units having multiple ethylenic unsaturation

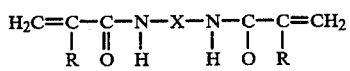

wherein
R=—H, —CH$_3$
X=—(CHY)$_n$—, n=1 to 10, and
Y=—H, —OH.

3. A polyvinyl acetal as claimed in claim 1, wherein the copolymer contains glyoxal bisacrylamide as the copolymerizable monomer units having multiple ethylenic unsaturation.

4. A polyvinyl acetal as claimed in claim 1, wherein the copolymer contains 0.001 to 5 mol %, with respect to the total molar amount of the copolymer, of monomer units from copolymerizable monomers having multiple ethylenic unsaturation.

5. A polyvinyl acetal as claimed in claim 1, wherein the copolymer contains, as vinyl ester monomer units, copolymerized carboxylic acid vinyl esters having 3 to 20 carbon atoms, and optionally further monoethylenically unsaturated comonomers.

6. A polyvinyl acetal as claimed in claim 1, wherein the soluble polyvinyl alcohol having a low degree of crosslinking has a degree of hydrolysis of 50 to 100 mol %.

7. A polyvinyl acetal as claimed in claim 1, wherein the acetalization was carried out using aliphatic, cycloaliphatic or aromatic aldehydes having 1 to 20 carbon atoms.

8. A polyvinyl acetal as claimed in claim 1, which contains 15 to 28% by weight, with respect to the polyvinyl acetal, of non-acetalized vinyl alcohol units.

9. A polyvinyl acetal as claimed in claim 1, wherein mixtures of a soluble polyvinyl alcohol having a low degree of crosslinking and a non-crosslinked soluble polyvinyl alcohol have been used for the acetalization reaction, or said polyvinyl alcohols have been acetalized individually and then mixed with one another.

10. A polyvinyl acetal as claimed in claim 1, wherein the melts of the organic solvent soluble starting vinyl ester copolymer has a low degree of crosslinking having a higher complex viscosity at 180° C. and a vibration cycle frequency of $10^{-1}$ rad/s, measured in the oscillation rheometer from Rheometrics as compared to non-crosslinked vinyl ester copolymer.

11. A polyvinyl acetal as claimed in claim 1, wherein, on measuring the complex viscosity of its melt at 200° C. in the oscillation rheometer from Rheometrics, the fall in the complex viscosity in the measurement range from $10^{-1}$ to $10^2$ rad/s is in the range from 6 to 25:1.

12. A polyvinyl acetal as claimed in claim 1, which is in the gelled or plasticized form and has plasticizer contents of 20 to 50% by weight, with respect to the gelled polyvinyl acetal.

13. A process for the preparation of a polyvinyl acetal having improved melt viscosity characteristics as claimed in claim 1 by acetalization of a water soluble polyvinyl alcohol having a low degree of crosslinking, wherein an organic-solvent soluble copolymer having a low degree of crosslinking is prepared by free radical-initiated copolymerization of a vinyl ester and copolymerizable monomer units from acrylamides or methacrylamides having multiple ethylenic unsaturation, and the resulting copolymer is hydrolyzed or alcoholized into a water soluble polyvinyl alcohol having a low degree of crosslinking, reacting the latter with an aldehyde or aldehyde acetal under acetalization conditions to form an organic solvent soluble polyvinyl acetal with a low degree of crosslinking and isolating the latter and optionally plasticizing the latter with the addition of plasticizer.

14. The process as claimed in claim 13, wherein, for the preparation of the organic-solvent soluble copolymer having a low degree of crosslinking from vinyl ester and copolymerizable monomer having multiple ethylenic unsaturation in amounts of 0.001 to 5 mol %, with respect to the total molar amount of the copolymer, the copolymerization is carried out as solution polymerization, optionally with minor amounts of molecular weight regulating agents which break off the radical chains.

15. The process as claimed in claim 13, wherein the soluble copolymer, having a low degree of crosslinking, of vinyl ester and monomer having multiple ethylenic unsaturation is converted by alkaline hydrolysis, saponification or transesterification into a soluble polyvinyl alcohol having a low degree of crosslinking.

16. The process as claimed in claim 13, wherein the reaction of the soluble polyvinyl alcohol having a low degree of crosslinking, or mixtures thereof with non-crosslinked soluble polyvinyl alcohols, with aldehydes or aldehyde acetals is carried out in aqueous medium or in organic solvents under acetalization conditions and with the addition of an acid catalyst.

* * * * *